United States Patent [19]

Brooker

[11] 4,315,601

[45] Feb. 16, 1982

[54] CHEMICAL INJECTOR

[76] Inventor: Steven A. Brooker, c/o Brooker Chemical Corp., 7633 Varna Ave., North Hollywood, Calif. 91605

[21] Appl. No.: 174,743

[22] Filed: Aug. 4, 1980

[51] Int. Cl.³ .............................................. B05B 7/04
[52] U.S. Cl. ............................... 239/142; 137/533.11; 137/539; 222/133; 222/383; 239/317; 239/318; 239/331; 239/407; 417/244
[58] Field of Search .................. 239/73, 74, 142, 310, 239/317, 318, 331, 407, 569; 222/129.2, 133, 380, 383, 278; 417/244; 137/533.11, 533.15, 533.13, 539, 539.5

[56] References Cited

U.S. PATENT DOCUMENTS

| 1,004,700 | 10/1911 | Sites | 239/142 |
| 1,582,225 | 4/1926 | Pulkinghorn | 239/142 |
| 1,981,623 | 11/1934 | Karter | 239/142 |
| 2,267,897 | 12/1941 | Carrico | 239/142 |
| 3,260,464 | 7/1966 | Harant | 239/318 |
| 3,303,800 | 2/1967 | Young | 239/318 |
| 3,367,353 | 2/1968 | Hunter | 239/310 |
| 3,478,963 | 11/1969 | Winn, Jr. | 239/142 |

*Primary Examiner*—Robert B. Reeves
*Assistant Examiner*—Michael J. Forman
*Attorney, Agent, or Firm*—Allan M. Shapiro

[57] ABSTRACT

Chemical injector comprises injector structure for injecting a solution from a reservoir into a flowing stream, usually water. The reservoir is at atmospheric pressure, and a chemical solution is withdrawn therefrom by Venturi action, with flow rate being controlled by passage size. Alternatively, an injector pump can positively pump the reservoir solution into the flow stream when the flow rate is too low for Venturi action. A flow control valve is also connected to a bottom portion of the piston of the pump to control the amount of chemical solution flowing from the reservoir to the flowing stream.

15 Claims, 8 Drawing Figures

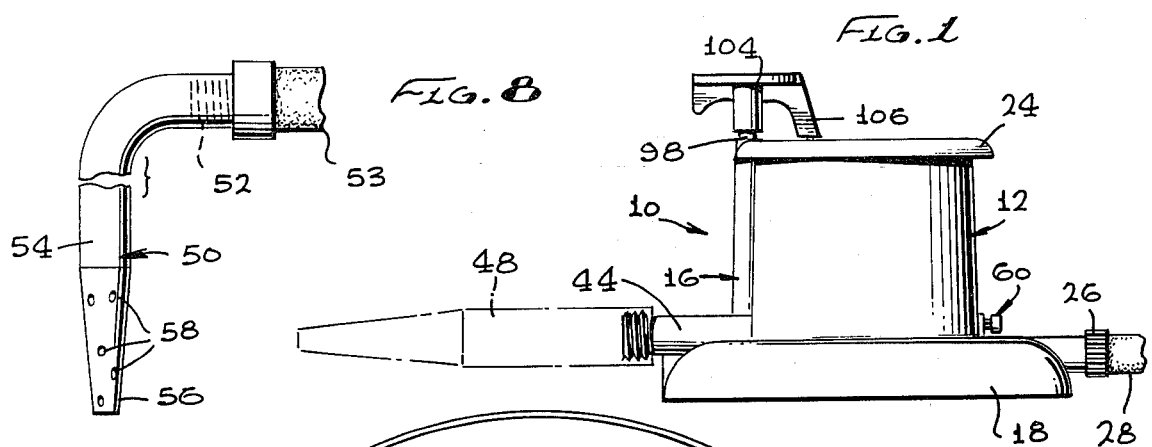
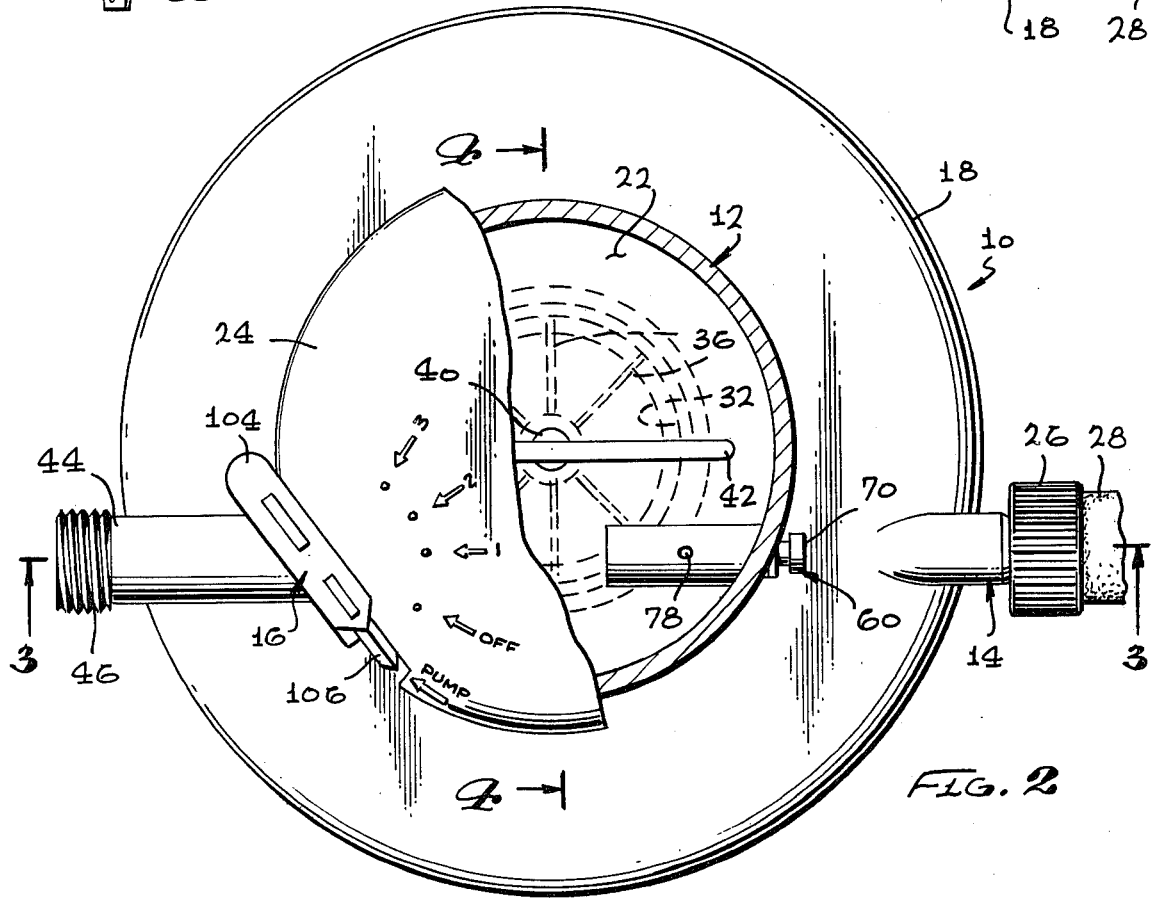
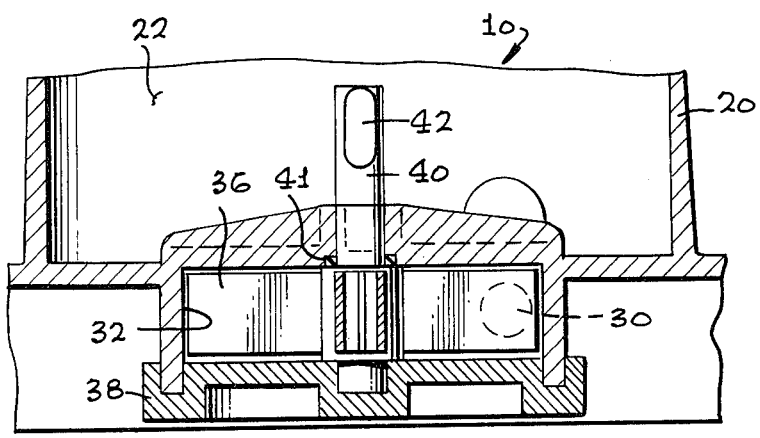

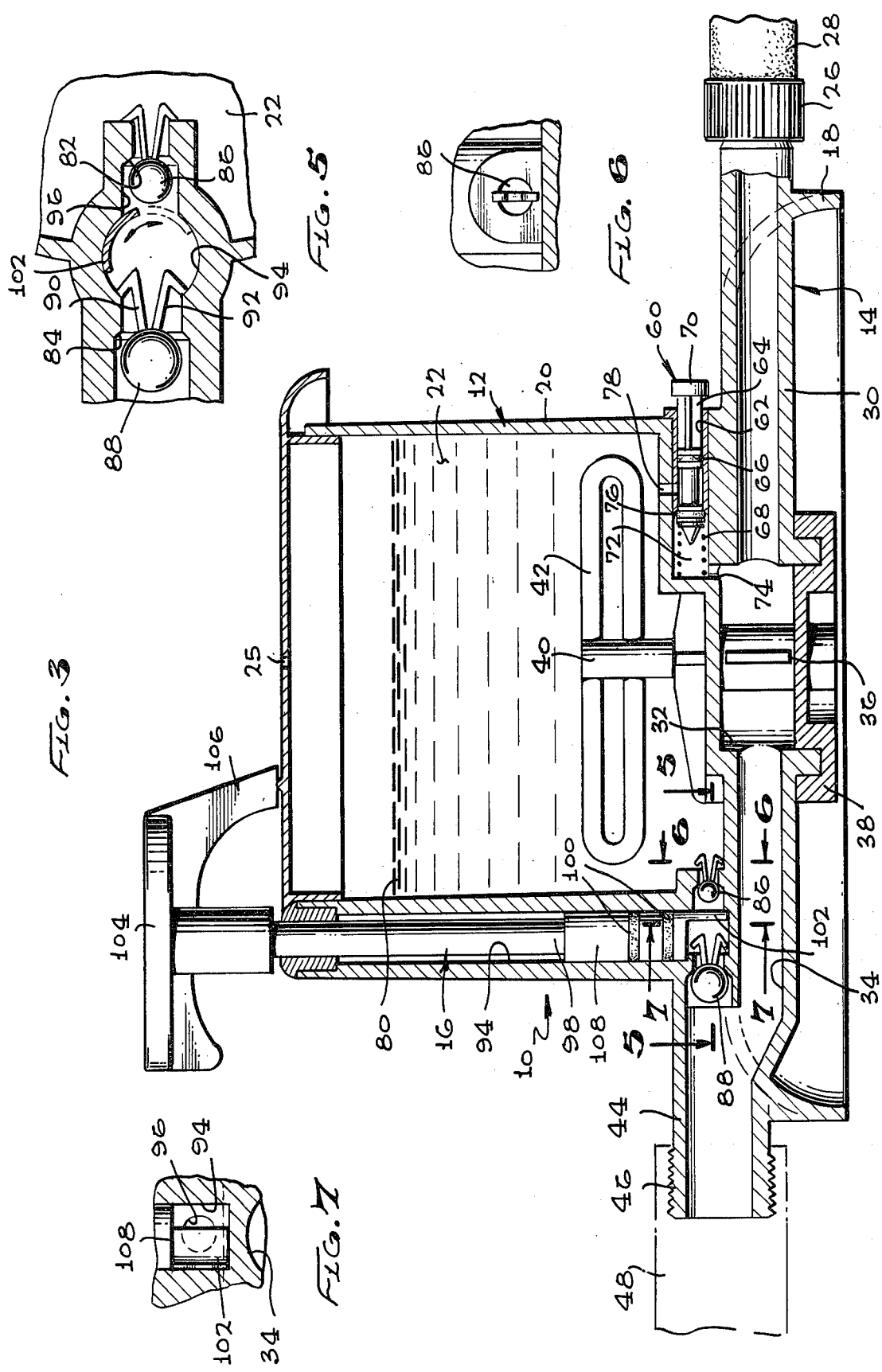

CHEMICAL INJECTOR

BACKGROUND OF THE INVENTION

This invention is directed to a chemical injector, and particularly an injector for placing in a water line so that a fertilize solution is mixed with the flow of water in the water line so that both water-soluble and insoluble material can be mixed into the water flowing through the water line. The material may be a fertilizer, insecticide, or other material which is helpful for the growth of plants, such as plant nutrients and insect control materials.

In order for the optimum growth of plants to be realized, essential nutrients must be distributed to them. A number of types of applications of soluble chemicals have been attempted in the past. Most means for distributing agricultural chemicals have not economically distributed the material, for it is necessary in today's economic management of agricultural growth that agricultural chemicals such as fertilizers, herbicides, insecticides, fungicides, and the like be accurately and efficiently delivered. Prior distribution methods, particularly when smaller amounts of material were to be applied over smaller area, were inefficient in applying too much material or ineffective in applying too little.

Furthermore, with many different kinds of fertilizers, insecticides, herbicides, and the like available on the market and required for different agricultural purposes, it is necessary that the apparatus used in this distribution be capable of providing the proper mixing ratio for each material, and this has been difficult to obtain with the prior equipment.

Therfore, there is a great need for a reliable chemical injector which can inject water-borne chemicals into an agricultural water flow stream so that proper mixing at the proper mixture ratio is accomplished for optimum application of the material.

SUMMARY OF THE INVENTION

In order to aid in the understanding of this invention, it can be stated in essentially summary form that it is directed to a chemical injector comprising a reservoir for containing a water solution of the chemical to be injected. A parallel water flow stream has a Venturi therein so that water flow through the Venturi draws chemical solution from the atmospheric pressure reservoir, with flow rate being controlled by control of the chemical solution flow channel size. When the flow rate is insufficient to draw solution from the reservoir, a reciprocating pump can be actuated to inject the chemical solution into the main stream.

It is thus an object of this invention to provide a chemical injector wherein a reservoir is employed at atmospheric pressure, and the flow of solution from the reservoir to a main flow stream can be controlled. It is another object to control the flow of chemical solution from the reservoir to the main stream by means of controlling the size of the solution channel. It is a further object to control the size of the solution channel by control of position of an external handle so that flow can be continuously regulated. It is another object to provide a manual reciprocating pump actuated by the same handle so that the structure can also furnish solution to the main flow stream by manual pumping, as well as control the inducted flow resulting from Venturi action.

The features of the present invention which are believed to be novel are set forth with particularly in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is a side-elevational view of the chemical injector of this invention.

FIG. 2 is an enlarged plan view thereof, with parts broken away and parts taken in section.

FIG. 3 is a longitudinal section therethrough, taken generally along the line 3—3 of FIG. 2.

FIG. 4 is a center line section of the structure shown in FIG. 2, with parts broken away.

FIG. 5 is an enlarged section taken generally along the line 5—5 of FIG. 3, showing the details of the valving structure.

FIG. 6 is a section taken generally along the line 6—6 of FIG. 3, with parts broken away.

FIG. 7 is a section taken generally along the line 7—7 of FIG. 3, with parts broken away showing the variable flow control orifice.

FIG. 8 is a side-elevational view of an underground irrigation point for use with the chemical injector of this invention.

DESCRIPTION OF THE PREFERRED EMBODIMENT

The chemical injector of this invention is generally indicated at 10 in FIGS. 1, 2 and 3. Chemical injector 10 comprises reservoir 12, water flow channel 14, and control structure 16 for the control of flow of chemical from the reservoir into the water flow channel. The entire chemical injector 10 is a unitary structure on base 18 of circular configuration so that a chemical injector can be rested on a horizontal surface. Reservoir 12 has a cylindrical, tubular, upstanding wall 20 which defines the storage volume 22 of the reservoir. Cover 24 covers the otherwise open top of the reservoir and is a friction fit for the prevention of entrance of contaninants and to prevent the splashing out of liquid material in the reservoir. Hole 25 in the center of cover 24 permits the passage of air into and out of reservoir 12 and, consequently, the storage volume 22 of the reservoir is at atmospheric pressure.

Water flow channel 14 has an inlet fitting 26 on which a supply hose 28 can be attached. Supply hose 28 is conventionally a garden hose which is connected to a hose bib for the supply of water for gardening purposes. Inlet fitting 26 is preferably threaded for the reception of the male end of a garden hose, as illustrated. Inlet tube 30, see FIG. 3, is integrally formed with the base and carries the hose connector inlet fitting 26 on its inlet end. Inlet tube 30 has a cylindrical bore therethrough which enters tangentially into cylindrical water motor housing 32, see FIGS. 3 and 4. Inlet tube 30 directs water tangentially into the motor housing and the water exits tangentially through Venturi tube 34, see FIG. 3. Motor cover 38 closes the bottom of the rotor housing and encloses rotor 36 therein. Rotor 36 has a plurality of vanes that extend into the path between the inlet tube and the outlet tube of the water flow channel 14. The lower end of the shaft of rotor 36 is mounted in a bearing in motor cap 38, and the upper end of rotor shaft 40 extends up past an O-ring seal 41 into the storage volume 22 of reservoir 12. The upper end of the rotor shaft, the portion in the storage volume, carries stirrer 42 thereon so that liquid in the storage volume 22 is stirred. Thus, water-soluble material passes readily into solution, and insoluble material is kept dispersed throughout the solution.

As water flows through water flow channel 14, which includes inlet tube 30, water motor housing 32 and Venturi tube 34, it moves to outlet tube 44 and outlet fitting 46. The outlet fitting is preferably a male garden hose fitting so that a garden hose can be used to distribute the water flow to the point of irrigation need. If desire, a nozzle 48 can be directly secured on outlet fitting 46 so that the nozzle can be employed to manually direct the water to the desired location. When it is desired that the water be used for root feeding, root feeder 50 can be attached to the outlet fitting 46 by way of its horizontally oriented female fitting 52 attached to garden hose 53 which then is attached onto outlet fitting 46. Root feeder 50 has a downwardly directed tube 54 with point 56 to permit the tube to be thrust into the ground. Point 56 may have a downwardly directed outlet, and preferably has a plurality of side outlets 58 from which the water is discharged into the underground, root zone.

Reservoir filling control valve 60 is provided to permit water to flow from the interior of the motor housing 32 into the storage volume 22 in the reservoir housing. The reservoir filling control valve 60 has a valve bore 62 in which valve stem 64 is slidably mounted. O-ring 66 seals between the valve bore and valve stem to prevent the leakage of water therebetween, and spring 68 thrusts the valve stem to the right. Thumb pad 70 permits the stem to be manually pushed to the left. Leftward of the stem 64, valve chamber 72, which contains spring 68, is open to water under pressure by channel 74 which connects the valve chamber 72 with inlet tube 30. O-ring 76 is mounted on valve stem 64 and is the valving member acting in conjunction with its seat. When thumb pressure moves valve stem 64 to the left, O-ring 76 is unseated and water can flow up through channel 74 into valve chamber 72, and thence past O-ring 76 and through reservoir opening 78 into storage volume 22 of the reservoir. In use, the valve 60 is opened until the reservoir is filled with reservoir water 80 to the desired volume. The reservoir water 80 acts as a solvent for material placed in the reservoir by the user. The material may be a water-soluble solid fertilizer, liquid fertilizer, fungicide, insecticide, or other similar material. Stirrer 42 aids in solution and maintaining uniform distribution of the solute.

Outlet from the storage volume 22 of the reservoir into outlet tube 44 for mixing with the main water flow is past check valve seats 82 and 84, see FIG. 5. Check valve balls 86 and 88 are respectively positioned to engage against those check valve seats for closing those valve openings. Check valve balls 86 and 88 each have fingers thereon which permit them to rise off the seats with leftward flow in FIG. 5, but retain them close enough to the seat so that, if there is reverse flow, the check valve balls will seat against their seats. As is seen in FIG. 5, check valve ball 88 has fingers 90 and 92. The ball and the fingers are molded together of thermoplastic synthetic polymer composition material, and the fingers are resilient enough so that they can be pressed through the seats. The hooks on the ends of the fingers engage beyond the seat to limit leftward motion of each ball.

Bore 94 between the check valves defines a cylinder which is positioned between the check valves. Seat bore 96, which contains check valve ball 86, opens into cylinder bore 94. When the bore 96 is unobstructed, it is the size of the check valve seats and the positioning of their adjacent valve balls that controls the flow of the solute mixture 80 from reservoir volume 22 into outlet tube 44. In normal circumstances, with a normally open outlet on nozzle 48, or in other normal outflow arrangement, the flow through Venturi tube 34 is enough to induce flow of solvent mixture through the check valve balls 86 and 88. The solute mixture from the reservoir and the water through Venturi tube 34 then mix in the outlet tube 44 so that the proper concentration of dissolved material is achieved in the outlet stream. In order to control the flow of solvent mixture from the reservoir, stem 98 extends downward in cylinder bore 94. Stem 98 is sealed with respect to the bore by means of a pair of O-rings 100. Skirt 102, see FIGS. 3, 5 and 7, extends downward from stem 98 to a position adjacent seat bore 96. As is best seen in FIGS. 5 and 7, rotation of the stem controls the effective opening of seat bore 96 into cylinder bore 94. In this way, the flow area can be controlled to control the ratio of the flow streams. Handle 104, see FIGS. 1, 2 and 3, is secured to the top of stem 98 to rotate the stem. The stem can be rotated so that pointer 106 on the handle can point to any one of the indicia representing different opening areas of the seat bor 96. As is indicated in FIG. 2, the handle can be turned from an "off" position where the skirt 102 completely covers seat bore 96 to other positions where different amounts of the seat bore are exposed to control the flow area. When the flow is sufficiently high through Venturi tube 34, the solvent mixture is aspirated through the check valves. Furthermore, the rate of aspiration flow is controlled by the position of skirt 102. In the preferred embodiment, aspiration is effective when the flow rate is adequate. When root feeder 50 is employed, the subsoil structure limits the outflow from the feeder and reduces the flow rate below that desired to achieve effective aspiration. In such a case, the solvent mixture 80 must be pumped into outlet tube 44. Stem 98 can be physically raised by grasp of handle 104 so that piston 108 carried on stem 98 and carring O-ring seal 100 can be raised in cylindrical bore 94 and subsequently thrust down. During the raising stroke, the solvent mixture 80 is drawn past check valve ball 86 into the cylinder and, when the handle and piston 108 are thrust down, check valve 86 is closed and the solution is thrust past check valve ball 88 into outlet tube 44 where it mixes with the main flow stream. In this way, the control structure 16 has the function of pumping the solution into the main flow stream as well as the function of permitting aspiration from the reservoir and controlling the aspiration rate.

The chemical injector 10 thus is a structure with a reservoir in which material can be dissolved and from which the solution, together with dispersed insoluble materials, can be mixed with the outflowing mainstream of water. It is particularly useful for agricultural applications, such as the mixing of agricultural chemicals with water and supplying the resultant solution mixture an agricultural water, either for the application of the material as a spray or as the application of the material as an irrigation flow which contains the proper amount of the agricultural chemical. The mixture and the injection of the agricultural chemical in the reservoir can be accomplished in the selected concentration, and the concentration in the reservoir can be controllably fed to the main water flow stream. In this way, the desired and required solution is easily achieved.

While the foregoing description has been directed to usage of fertilizers, insecticides and the like, it now should be clear that other chemicals or ingredients can be dispensed with similar utility, such as soaps and detergents for example.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A chemical injector comprising:
    a reservoir for containing a chemical-bearing liquid;
    a water flow channel having an inlet and an outlet, with its inlet being for the connection to a supply of water under pressure and its outlet being for connection to equipment for the discharge of a liquid;
    a Venturi tube in said water flow channel for causing a zone of reduced pressure when water flows through said water flow channel from the inlet to the outlet thereof;
    an aspirating channel provided between said reservoir and said zone of reduced pressure for aspirating chemical-bearing liquid from said reservoir into said water flow channel, said aspirating channel having first and second check valves therein, both of said check valves permitting flow in a direction from said reservoir to said zone of reduced pressure and preventing flow in the opposite direction;
    a cylinder bore between said check valves, a stem in said cylinder bore, a skirt on said stem, said skirt extending across said aspirating channel and being positionable within said aspirating channel to control flow through said aspirating channel, depending on position of said stem, said stem also having a piston thereon slidably received in said cylinder bore so that motion of said stem pumps liquid from said reservoir into said zone of reduced pressure so that said stem controls aspirated flow and movement of said stem controls pump flow from said reservoir into said water flow channel.

2. The chemical injector of claim 1 wherein said stem and said check valves form a portion of a control structure, said control structure including a handle for the positioning of said skirt and for the movement of said piston.

3. The chemical injector of claim 2 wherein said piston is positioned in said cylinder bore, and said aspirating channel passes through a portion of said cylinder bore.

4. The chemical injector of claim 3 wherein said check values each comprise ball check valves which are seatable on a respective seat through which said aspirating channel extends, said check valve balls having ball retainers in association therewith for retaining said balls adjacent said seats.

5. The chemical injector of claim 4 wherein said ball retainers comprise resilient fingers mounted on said balls, said resilient fingers extending through a portion of said aspirating channel to engage against a surface opposite from said seats so that said fingers limit motion of said balls away from said seats.

6. The chemical injector of claim 5 wherein a water motor is positioned to have vanes in said water flow channel and a stirrer is connected to be driven by said vanes, said stirrer being positioned in said reservoir.

7. The chemical injector of claim 5 wherein a manually operable valve is connected between said water flow channel and said reservoir so that upon actuation water flows from said water flow channel into said reservoir.

8. The chemical injector of claim 7 wherein said manually operable valve has a reciprocable valve stem movable from a valve-closed position to a valve-open position wherein a seal on said stem is moved away from a seat to provide an opening between said water flow channel and said reservoir, and a spring engages against said stem to thrust said stem in the valve-closed direction.

9. The chemical injector of claim 1 wherein a water motor is positioned to have vanes in said water flow channel and a stirrer is connected to be driven by said vanes, said stirrer being positioned in said reservoir.

10. The chemical injector of claim 1 wherein a manually operable valve is connected between said water flow channel and said reservoir so that upon actuation water flows from said water flow channel into said reservoir.

11. The chemical injector of claim 10 wherein said manually operable valve has a reciprocable valve stem movable from a valve-closed position to a valve-open position wherein a seal on said stem is moved away from a seat to provide an opening between said water flow channel and said reservoir, and a spring engages against said stem to thrust said stem in the valve-closed direction.

12. A chemical injector comprising:
    a water flow channel having an inlet connection thereon for connection to a supply of water under pressure and an outlet connection thereon for discharge of a liquid, a Venturi section in said water flow channel for producing a zone of reduced pressure in said water flow channel upon the passage of an adequate flow of water through said water flow channel, a motor having a portion thereof positioned in said water flow channel for motion when water flows through said water flow channel;
    a reservoir for the containment of a chemical-bearing liquid, said reservoir being integrally structured with the walls defining said water flow structure and including a stirrer in said reservoir rotated by said portion of said motor;
    a control structure integrally formed with said reservoir and interconnecting said reservoir with said zone of reduced pressure in said water flow channel, said control structure including an aspirating channel, first and second check valves in said aspirating channel, a cylinder in said aspirating channel between said check valves, a piston in said cylinder, a skirt secured to said piston and positioned so that upon rotation of said piston, said skirt moves in and out of said aspirating channel to control the open area of said aspirating channel, a handle connected to said piston for rotating said piston to control said skirt and the open area of said aspirating channel and to axially move said piston in said cylinder to pump liquid from said reservoir through said aspirating channel into said water flow channel so that liquid can be moved from said reservoir into said water flow channel either by aspiration with flow rate controlled by position of said skirt and by positive pumping by reciprocation of said piston within its cylinder.

13. The chemical injector of claim 12 wherein said check valves are ball check valves, and means is provided to limit the motion of said ball check valves off of their seats.

14. The chemical injector of claim 13 wherein said check valves are formed with resilient fingers thereon, said resilient fingers reaching at least partway through said aspirating channel and engaging on a surface facing said ball seat so that said fingers retain said check valve balls adjacent their respective seats.

15. The chemical injector of claim 12 wherein a reservoir filling control valve is positioned between said water flow channel and said reservoir, said reservoir filling control valve having a stem and a valving member on said stem, a seat adjacent said valving member and a spring to urge said valving member against said seat, manually engageable means for thrusting said valving member off said seat so that water can flow from said water flow channel into said reservoir to fill said reservoir to a desired level.

* * * * *